(No Model.)
J. M. PENDLETON.
SYSTEM FOR REGULATING AND CONTROLLING ELECTRIC MOTORS.
No. 343,394. Patented June 8, 1886.
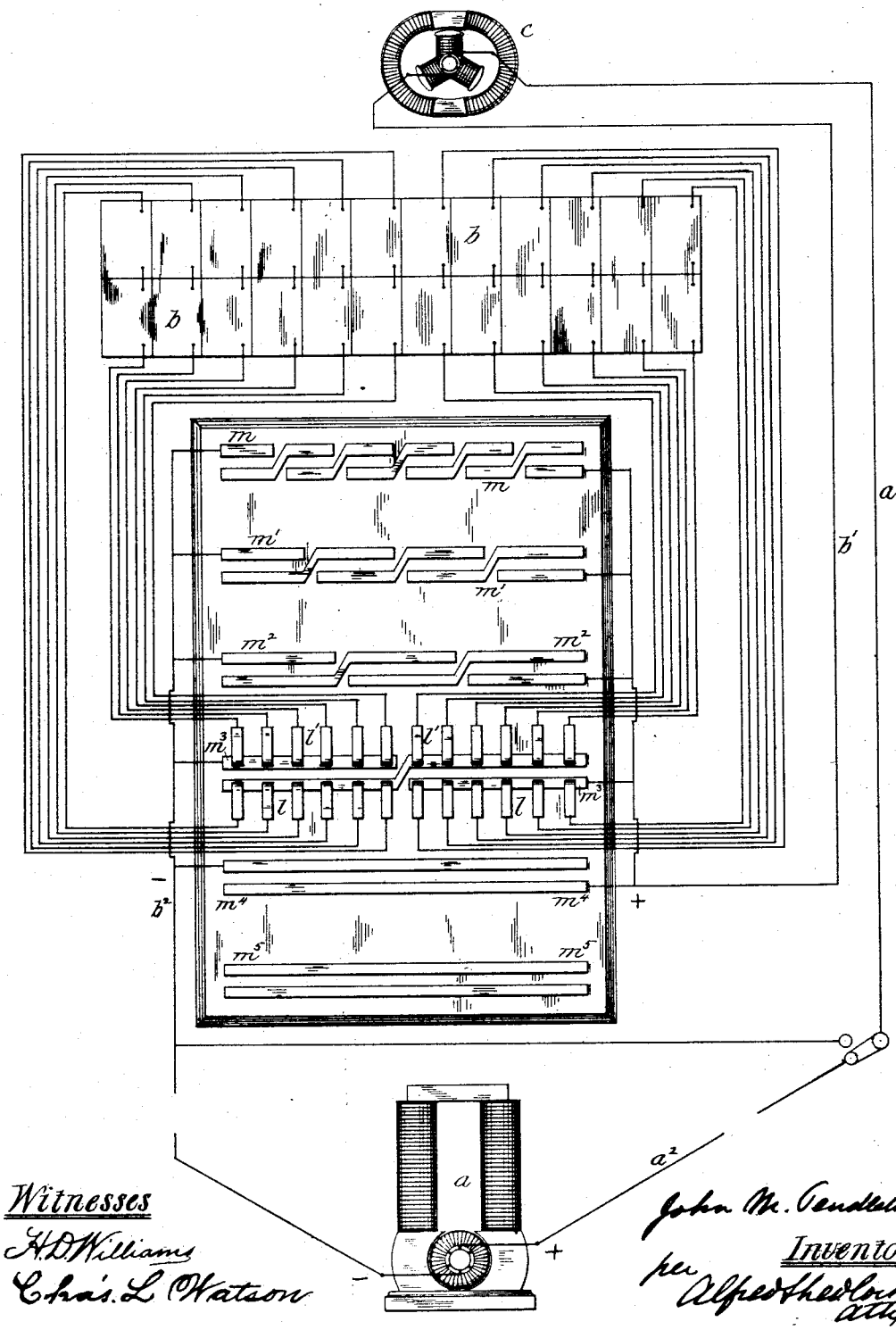
Witnesses
H. D. Williams
Chas. L. Watson
John M. Pendleton,
Inventor
per Alfred Hedlock
Atty.

UNITED STATES PATENT OFFICE.

JOHN M. PENDLETON, OF NEW YORK, N. Y.

SYSTEM FOR REGULATING AND CONTROLLING ELECTRIC MOTORS.

SPECIFICATION forming part of Letters Patent No. 343,394, dated June 8, 1886.

Original application filed March 1, 1886, Serial No. 193,553. Divided and this application filed May 6, 1886. Serial No. 201,290.

(No model.)

*To all whom it may concern:*

Be it known that I, JOHN M. PENDLETON, a citizen of the United States, residing at New York, county and State of New York, have invented a certain new and useful Improvement in Regulating and Controlling Electro-Motors, of which the following is a specification.

In my application for Letters Patent filed March 1, 1886, under Serial No. 193,553, is described and claimed the application of accumulators or storage-batteries to a system of electrical locomotion for regulating the electromotors of self-propelling cars, and compensating for the varying resistance of the charging or working circuit between the motor-cars and the stationary source of electricity as the cars change their positions on the line.

This is a division of the above-mentioned application, and the invention embraced herein covers, generally, the principle involved—viz., the regulation of electromotors in circuits of electromotor systems by opposing to the charging or working electric current variable counter electro-motive forces.

The invention further contemplates the storage of all excess of the electrical energy acting through the motor-circuit from a source of constant supply beyond what is utilized in the motor by means of a storage-battery or an accumulator composed of a number of cells in conjunction with a commutator-switch which connects the cells together in different combinations of series and multiple arc, according to the exigencies of the case, and the proportional amounts of the charging or working current it is desired to have utilized in or by the motor and stored for future use in the accumulator.

To carry out this system economically, the accumulator-cells should be of a number having several integral factors, so that in the various arrangements in which they may be placed every cell shall always be in the circuit, either absorbing the excess of working-current or giving out the stored energy as electric current to actuate the motor when the charging or working current ceases or the accumulator becomes charged; and the electromotive force of the highest order of series in which the cells of the accumulator can be placed may be such as to entirely oppose or counteract that of the charging or working current, or only sufficient to nearly oppose the working-current, allowing a small quantity of this working-current, insufficient to actuate the motor, to flow through the circuit and accumulator.

It is apparent that great economy is had by the use of this system of regulating and controlling electromotors over the common practice of inserting variable dead-resistances in motor-circuits. Such dead-resistance regulators cause waste of the excess of current beyond what is utilized in the motor by dissipating it in the form of heat, whereas the electrical energy not utilized in the motor is in my system converted into chemical energy available for future use.

In the accompanying drawing, forming part of this specification, is shown a diagram view giving the connections and arrangements of the various devices used in one application of my method of regulating and controlling electromotors.

It is premised that the number of cells or divisions of the accumulator and the number of combinations in which the cells or divisions may be placed to vary the counter electromotive force opposed to the charging or working current, and the arrangement of circuit-connections adopted, will be such as to meet the requirements of each application of my improved motor regulating and controlling system, the number of cells and divisional arrangements thereof and the circuit-connections shown in the drawings and now described being selected for easy explanation of the system.

The accumulator $b$ comprises twenty-four cells connected together in pairs, the positive terminal of each pair of cells being provided with a brush, $l$, and the negative terminal of each pair of cells with a brush, $l'$. These brushes $l$ and $l'$ are arranged in two rows, and bear on the contact-blocks of the commutating switch. The upper set of contact-blocks, $m$, when brought under the brushes $l$ and $l'$, arrange the twenty-four cells of the accumulator in double series, comprising twelve cells in each series. The second set, $m'$, arrange the twenty-four cells in triple series of eight each. The third set, $m^2$, arrange them in quadruple series of six each; the fourth set, $m^3$, in sextuple series of four each, and the fifth set, $m^4$, in duodecuple series of two each. The end block of the row of each set upon which the positive brushes $l\ l$ bear is connected to the line $b'$, and the end block of the row of each set upon which the negative brushes $l'\ l'$ bear is connected to the line $b^2$. These lines $b'$ and $b^2$ are, where they join the commutator connections, respectively marked $+$ and $-$, to indicate the direction of energy of the counter electro-motive force of the accumulator.

The lower isolated blocks or strips, $m^5$, of the commutating-switch, when brought under the brushes of the accumulator, connect all the positive and all the negative terminals of the pairs of cells respectively together, for the purpose of equalizing the stored energy and electro-motive force of all the cells, the more strongly charged cells giving up some of their energy to the weaker ones. In other words, the electric energy stored in the accumulator, if irregularly divided between the different cells, is by this means equally and uniformly distributed among them. This part of the switch may be brought into action at any time when the motor in the circuit is not in use, and also answers as a means for breaking the motor-circuit.

The line $b'$ joins one of the terminals of the motor $c$ to the commutator, the other terminal of the motor being connected by the line $a'\ a^2$ to the source $a$ of the charging or working current. The other line, $b^2$, completes the circuit by joining the commutator to the said source of electricity.

When it is desired to actuate the motor $c$ by the stored energy of the accumulator $b$, the switch $a^4$ is moved from its contact-point in the part $a^2$ of the main line to the contact-point at the end of the line $a^3$, the other end of which joins the line $b^2$, thus completing the circuit of the motor and accumulator, and cutting them out of the charging-circuit.

In the application of my invention shown by the accompanying drawing the motor or translating device $c$ and regulating-accumulator $b$ are placed in single series. This arrangement is preferable for most purposes; but they may be connected in other ways, if desirable. In this arrangement the counter electro-motive force of the accumulator $b$ acts directly to oppose or partly oppose the electro-motive force of the current in the charging or working circuit.

If the counter electro-motive force of the accumulator is made to equal the electro-motive force of the charging-current when the brushes $l\ l'$ bear on the blocks $m\ m$ of the commutator, then when the brushes $l\ l'$ bear on the blocks $m'\ m'$ the accumulator will approximately oppose to the charging-current a counter electro-motive force equal to two-thirds of the charging-current, when the blocks $m^2\ m^2$ are in action one-half the charging-current, one-third of the charging-current when the brushes $l\ l'$ occupy the positions shown on the blocks $m^3\ m^3$, and one-sixth of the charging-current when the brushes bear on the blocks $m^4\ m^4$.

It is obvious that the energy supplied to the motor or translating device may be varied at will, and no loss of energy is occasioned when the electric current required to be converted into other form of energy or work is less than the total constant amount of electrical energy available to the working-circuit, and that the speed or power of the motor may be governed when the current energizing it is made variable by changes in the circuit.

I am aware that batteries and accumulators have been employed to regulate electric currents generated by dynamo-electric machines—as, for instance, in the United States Letters Patent No. 286,833, dated October 16, 1883, a method is described of charging accumulators by a dynamo-electric machine, and gradually changing the cells, which are always arranged in single series from the charging to the working circuit, or vice versa, as more or less current is required in the working-circuit—so I do not claim, broadly, regulating electric currents by means of an accumulator or storage battery; but

What I claim, and desire to secure by Letters Patent, is—

1. The improved method of regulating electromotors which consists in operating such motors by the differential of two opposing sources of current and varying the electro-motive force of one of said sources.

2. The improved method of regulating electromotors having an available constant working electric current by opposing to said current a variable counter electro-motive force, storing excess of energy of the working-current as chemical energy, and subsequently utilizing such stored energy to actuate the motor.

3. The combination, with an electromotor supplied with a constant current, of an accumulator or storage-battery arranged to receive and store up any excess of current supplied to the motor-circuit, a commutator-switch for changing the connections of the cells, whereby all the cells are arranged in various combinations of series and multiple arc, and the counter electro-motive force of the battery altered to regulate and control the supply of electrical energy to the motor.

In testimony whereof I have hereunto set my hand, at New York, county and State of New York, this 5th day of May, 1886.

JOHN M. PENDLETON.

Witnesses:
ALFRED SHEDLOCK,
H. D. WILLIAMS.